United States Patent [19]
Fanelli et al.

[11] 3,884,975
[45] May 20, 1975

[54] RHODIUM CATALYST FOR HYDRATION OF ACRYLONITRILE

[75] Inventors: Anthony Joseph Fanelli; Francis Clyde Rauch, both of Stamford, Conn.

[73] Assignee: American Cyanamid Company, Stamford, Conn.

[22] Filed: Oct. 5, 1972

[21] Appl. No.: 296,363

[52] U.S. Cl. .......................... 260/561 N; 260/561 R
[51] Int. Cl. ............................................ C07c 103/08
[58] Field of Search ................................. 260/561 N

[56] References Cited
UNITED STATES PATENTS

| | | | |
|---|---|---|---|
| 3,670,021 | 6/1972 | Goetz et al. .................... | 260/561 N |
| 3,673,250 | 6/1972 | Rauch et al. .................... | 260/561 N |
| 3,696,152 | 1/1972 | Habermann et al. ............ | 260/561 N |
| 3,763,235 | 10/1973 | Newcomb et al. .......... | 260/561 N X |

*Primary Examiner*—Lewis Gotts
*Assistant Examiner*—Ethel G. Love
*Attorney, Agent, or Firm*—Gordon L. Hart

[57] ABSTRACT

Mercury promoter for rhodium catalyst systems used in catalytic hydration of nitriles, particularly for hydration of acrylonitrile to make acrylamide.

5 Claims, No Drawings

RHODIUM CATALYST FOR HYDRATION OF ACRYLONITRILE

The invention relates to improvements in the catalytic hydration of nitriles with water to produce corresponding amides. For example, acrylonitrile is hydrated by the process of the invention to produce acrylamide.

The invention is an improvement of the catalytic processes described in U.S. Pat. No. 3,673,250, patented June 27, 1972 to F. C. Rauch and G. W. Nachtiigall and in U.S. application Ser. No. 259,172, filed June 2, 1972 by Rauch and Nachtigall, titled "Catalytic Hydration of Nitriles to Produce Amides", now U.S. Pat. No. 3,821,300, and in U.S. application Ser. No. 259,173, filed June 2, 1972 by Fanelli, Blank and Rauch, titled "Catalytic Hydration of Nitrile to an Amide Using Specified Homogeneous Catalysts," now U.S. Pat. No. 3,801,639.

The specifications in those patents and applications are incorporated herein by reference. They describe, in part, a hydration reaction of a nitrile and water in solution with a homogeneous catalyst system comprising a transition metal compound, e.g. rhodium trichloride, and an organic phosphine or phosphite or a selected phosphine oxide. The selected transition metal compound is of a transition metal that can form a coordination complex in the solution with the selected organic phosphine, phosphite or phosphine oxide. Rhodium is a preferred transition metal for this purpose.

According to the present invention, the activity of the homogeneous catalyst system, in a process of the kind described in the foregoing specifications wherein the selected transition metal is rhodium, is improved substantially by the addition of a soluble compound of a second transition metal, preferably mercury, which may be added in catalytic amount to the homogeneous catalytic reaction mixture. A preferred compound for the purpose is mercuric chloride, $HgCl_2$, but other compounds of mercury or of another transition metal which are soluble in the reaction mixture can be used instead. Presence of the second transition metal compound is found to substantially reduce the induction period, which is the period after start of the process during which the catalytic activity gradually increases to a maximum value. The rhodium component of the catalyst system can be any compound of rhodium that is soluble in the reaction mixture, or that can be solubilized in the reaction mixture, for example, rhodium trichloride.

Organic phosphines that can be selected as catalyst components include those described in more detail in the U.S. Pat. No. 3,673,250, cited above. Some especially preferred organic phosphines are triphenyl, tri-p-tolyl, tri-(p-chlorophenyl), triethyl, diphenyl-ethyl, trianisyl and naphthyldiethyl phosphines, and the like.

Organic phosphites that can be selected as catalyst components include those described in more detail in the same patent and in the U.S. patent application Ser. No. 259,172, filed June 2, 1972 by Rauch and Nachtigall, cited above. Some especially preferred organic phosphites are triethyl, trimethyl, diethyl, dimethyl, triphenyl, diphenyl, di-octadecyl, phosphites and the like.

Organic phosphine oxide components that can be used as catalyst components independently, without the additional presence of an organic phosphine or phosphite include those diaryl and dialkyl phosphine oxides that are described in more detail in the U.S. patent application Ser. No. 259,173, filed June 2, 1972 by Fanelli, Blank and Rauch, cited above. Some especially preferred dialkyl and diaryl phosphine oxides are diphenyl, di-(p-chlorophenyl), dianisyl, di-(p-chlorophenyl), diethyl, di-[3,5-bis(trifluromethyl)phenyl] phosphine oxides, and the like.

The reaction conditions for a process according to the invention using a compound of a second transition metal as a catalyst promoter with the other catalyst components, would usually be within those ranges of reaction conditions that are described in more detail in the aforesaid U.S. Pat. No. 3,673,250. One noticeable improvement obtained in most embodiments of the invention, as compared with systems not using the second transition metal promoter, will be the accelerated induction period, that is, the period is shortened during which the catalyst activity gradually increases from a relatively low rate at the start of the reaction to a maximum rate that is usually reached only after several hours of reaction time. A second advantage obtained by the invention in those embodiments where a mercuric compound is employed with rhodium and a diaryl phosphine oxide or a dialkyl phosphine oxide is an increased maximum rate of catalytic activity as compared with otherwise comparable systems not having the mercuric promoter.

The catalytic hydration is preferably carried out with a stoichiometric excess of nitrile having water dissolved therein up to the saturation amount. It is preferred to have all of the reactants and the catalyst components in a homogeneous solution for the reaction, but an excess of one of the reactants, e.g. an excess of water over the saturation amount, or an excess of one catalyst component may cause a tolerable phase separation of such excess amount from the homogeneous solution phase in which the reaction occurs.

For the following detailed examples we have selected the most preferred embodiments of the invention illustrating the hydration of acrylonitrile to produce acrylamide to set forth the best mode presently contemplated of carrying out the invention but the invention can be used for hydration of other nitriles with water using other combinations of catalyst components and other reaction conditions within the broader scope of the various classes of reactants and ranges of reaction conditions as those are described and defined herein and described in those other specifications expressly incorporated herein by reference.

EXAMPLE 1

A reaction solution of 10 ml acrylonitrile (AN) containing 0.2 millimole (m mole) of $Rh(CH_3-CH_2-CN)_3Cl_3$, 0.2 m mole $HgCl_2$, 0.2 m mole of diphenylphosphine oxide acetone complex and 0.2 m mole of 2,2'-methylene bis (t-butyl-p-cresol) as polymerization inhibitor is prepared. The $Rh(CH_3CH_2CN)_3Cl_3$ is a soluble rhodium complex previously prepared from $RhCl_3 \cdot 3H_2O$ and propionitrile; the soluble acetone-diphenylphosphine oxide complex has been previously prepared from acetone and diphenylphosphine oxide. The homogeneous reaction solution is thermostatted at 70° and water is added in 0.2 ml increments as needed to maintain the presence of water reactant.

The conversion of acrylonitrile to acrylamide (AMD) is monitored by gas chromatography frequently during the process. Following an induction period lasting about two hours, the acrylamide formation proceeds thereafter at a maximum linear rate of 5.6 mole/liter/hr. (280 moles AMD/mole Rh-hr.). Water addition is stopped to terminate the reaction when the acrylamide concentration in the reaction solution reaches approximately 45 percent by weight.

In another reaction, the same as above except that 0.4 m mole $HgCl_2$ is added at the start of the reaction instead of 0.2 m mole, similar results are obtained.

In another reaction the same as above except $HgCl_2$ is not incorporated in the reaction mixture, an induction period of about 25 hours is observed before the rate reaches a maximum value of about 2.0 mole/1-hr. (100 moles AMD/mole Rh-hr.).

EXAMPLE 2

In a reaction similar to that of Example 1, a solution is prepared containing 0.02 mole (M) $RhCl_3(CH_3CH_2CN)_3$, 0.01 M $HgCl_2$, 0.02 M diphenylphosphine oxide and 0.05 M 2,2'-methylene bis (t-butyl-p-cresol). The latter serves as polymerization inhibitor. After an induction period of only 2 hours, the rate of acrylamide formation stabilizes at a linear rate of 9.40 moles AMD/1-hr. (470 moles AMD/mole Rh-hr.).

When mercury is not incorporated as promoter, the induction period is about 24 hours and the maximum rate observed is about 2.0 moles AMD/1-hr.

EXAMPLE 3

The reaction rate shows a non-first-order dependence on the concentration of catalyst, i.e. if more dilute solutions of catalyst are used, the rate falls by a larger factor than the dilution factor and vice-versa on increasing the concentration.

A portion of the reaction mixture from Example 2, is diluted with acrylonitrile by a factor 6.6 to give a concentration of 3 m mole $RhCl_3(CH_3CH_2CN)_3$ and 1.5 m mole $HgCl_2$. The maximum rate is 0.65 moles/1-hr. (225 moles AMD/mole Rh-hr.). Under similar conditions but in the absence of $HgCl_2$ the rate observed was 0.12 moles/1-hr. (40 moles AMD/mole Rh-hr.).

EXAMPLE 4

The series of reactions tabulated in Table I shows that the ratio of molar concentrations of the several catalyst components, e.g. Rh:Hg:DPPO can be varied over a rather wide range while still observing the effect of promotion of the reaction by $HgCl_2$ but that all of these components are required to obtain the improved rates. The optimum ratio in terms of improved rate appears to be 2Rh:1Hg: 2-diphenyl phosphine oxide (DPPO). The reactions in Table I were carried out as in Examples 1 and 2 using the tabulated concentrations of catalyst components.

TABLE I

| Catalyst Component Concentrations, molar | | | Induction (hrs.) | Activity Rate (moles AMD/ mole Rh-hr.) |
|---|---|---|---|---|
| $RhCl_3(CH_3CH_2CN)_3$ | $HgCl_2$ | DPPO | | |
| .02 | .01 | .02 | 2 | 470 |
| .02 | .02 | .02 | 2 | 280 |
| .02 | .04 | .02 | 2 | 285 |
| .02 | .10 | .02 | 2 | 190 |
| .02 | .01 | .03 | 2 | 280 |
| .02 | 0 | .02 | 25 | 100 |
| .02 | 0 | 0 | — | 0 |

In the foregoing examples only the preferred mercuric chloride was used but at least some of the advantages of the invention can be obtained using other mercuric compounds or using other transition metal promoters instead of mercury in addition to the rhodium and phosphorus-containing catalyst components.

EXAMPLE 5

The series of reactions tabulated in Table II shows effects on the induction period and on the maximum activity rate obtained with mercuric compounds and other transition metal compounds used as promoters in catalyst systems in addition to the rhodium catalyst component. In all cases the induction period was substantially reduced in time. The several reactions were carried out as in Examples 1 and 2 but with the particular phosphorus compounds and the particular second transition metal compounds in the amounts tabulated in each line of Table II. In all reactions the rhodium catalyst component used was 0.02 M $RhCl_3$ solubilized by means of the propionitrile complex of $RhCl_3$.

TABLE II

| Phosphorus Component | Promoter [.02M] | Induction Period (Hrs.) | Maximum Linear Activity Rate (moles AMD/mole Rh/hr.) |
|---|---|---|---|
| Diethyl Phosphite | None | 22 | 0.11 |
| Diethyl Phosphite | $HgCl_2$ | 1 | 0.12 |
| Diphenyl Phosphine Oxide | None | 24 | 1.5–2.0 |
| Diphenyl Phosphine Oxide | $HgCl_2$ | 2 | 5.6 |
| Diphenyl Phosphine Oxide | $Hg(CH_3COO)_2$ | 2 | 1.8 |
| Diphenyl Phosphine Oxide | $AgNO_3$ | 2 | 1.9 |
| Diphenyl Phosphine Oxide | $CoCl_3[(C_6H_5)_3P]_2$ | 3 | 1.75 |
| Diphenyl Phosphine Oxide | $NiCl_2[(C_6H_5)_3P]_2$ | 2 | 2.0 |
| Diphenyl Phosphine Oxide | $ZnCl_2$ | 4 | 1.9 |
| Diphenyl Phosphine Oxide | $CuCl_2$ | 2.5 | 1.6 |
| Triphenyl Phosphine | None | 25 | .05 |
| Triphenyl Phosphine | $Hg(CH_3COO)_2$ | 3 | .05 |
| Triphenyl Phosphine | $HgCl_2$ | 2.5 | .06 |

The foregoing descriptions illustrate the improvement of catalyst activity in terms of shortened incubation period using a variety of transition metal compounds as the promoters in the rhodium-organic phosphine, phosphite or phosphine oxide systems. Furthermore in systems having both a dialkyl or diaryl phosphine oxide and a mercuric compound promoter there is substantial improvement of the catalyst activity in terms of a higher maximum rate of conversion.

We claim:

1. In a process for producing acrylamide by the catalytic hydration reaction of acrylonitrile with water in a liquid homogeneous solution with a catalytic amount of homogeneous catalyst which comprises a member selected from the group consisting of diaryl phosphine oxides and which also comprises a compound of rhodium that is capable of forming a coordination complex with said phosphine oxide, the improvement wherein there is also present in said liquid homogeneous solution a catalytic amount of a soluble mercuric compound.

2. A process defined by claim 1 wherein said mercuric compound is mercuric chloride and said diaryl phosphine oxide is diphenyl phosphine oxide.

3. A process defined by claim 1 wherein the selected soluble mercuric compound is mercuric chloride.

4. A process defined by claim 2 wherein said selected rhodium compound is rhodium trichloride.

5. A process defined by claim 3 wherein said selected phosphine oxide component is diphenyl phosphine oxide.

* * * * *